United States Patent Office

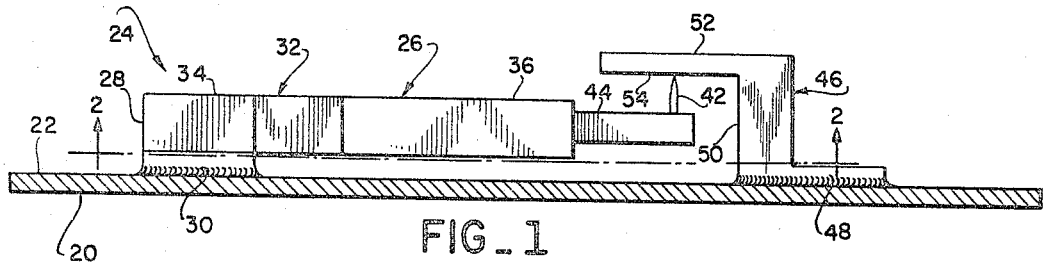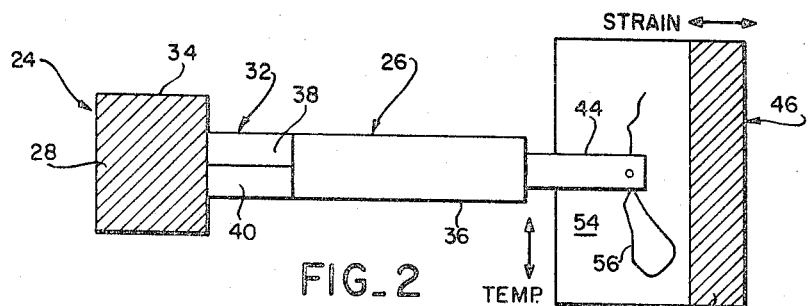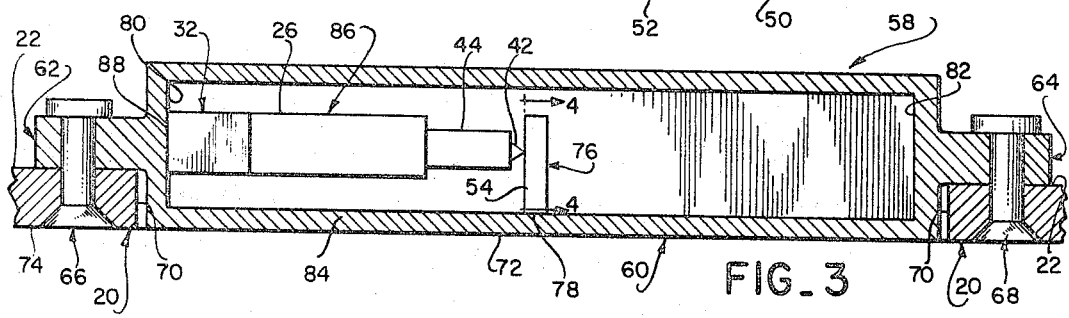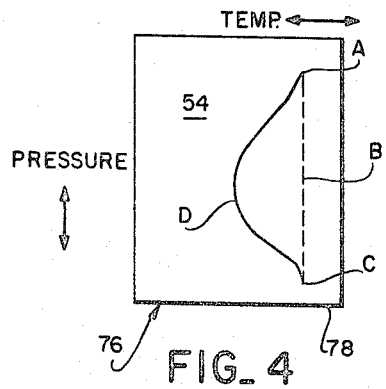

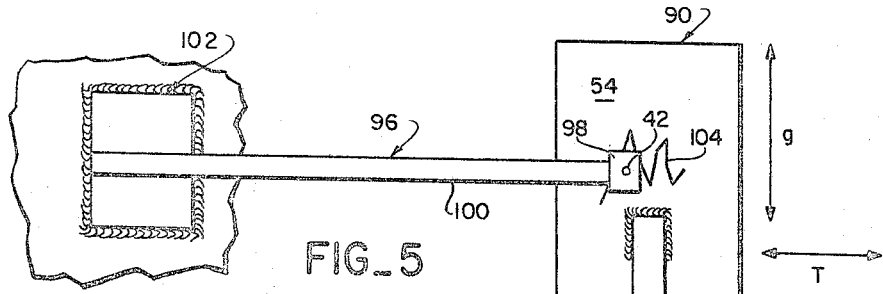
FIG_5
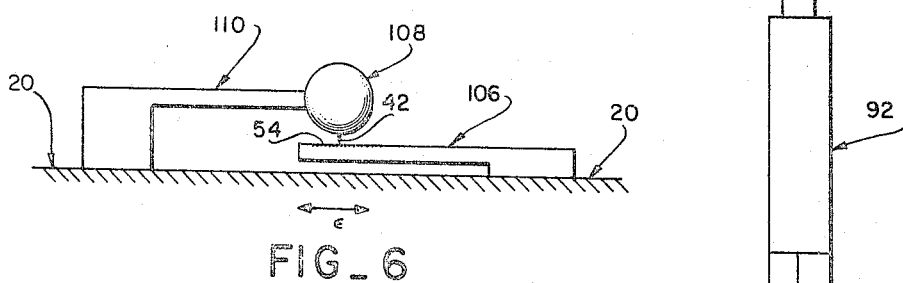
FIG_6
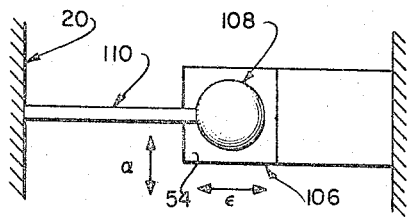
FIG_7
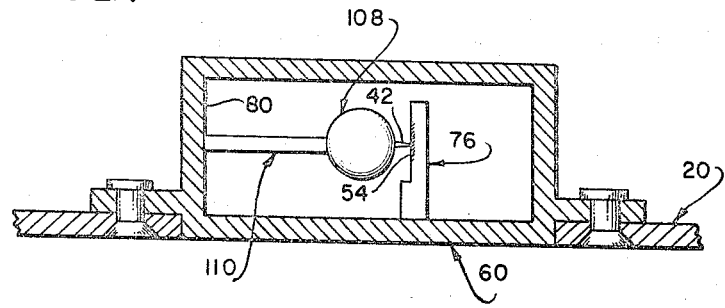
FIG_8

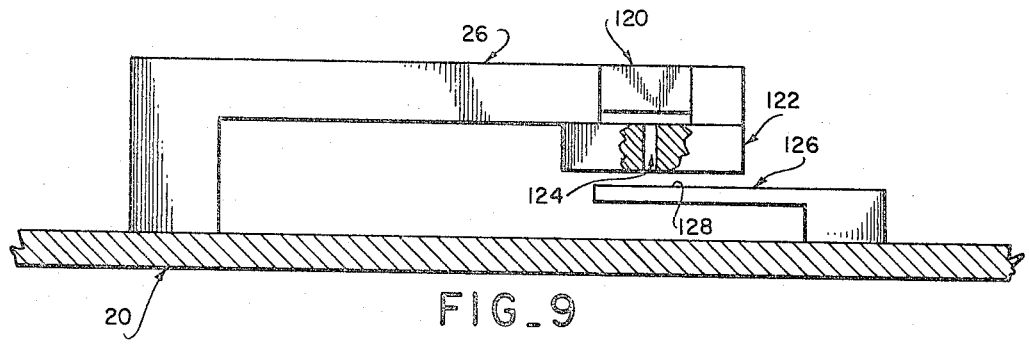
FIG_9
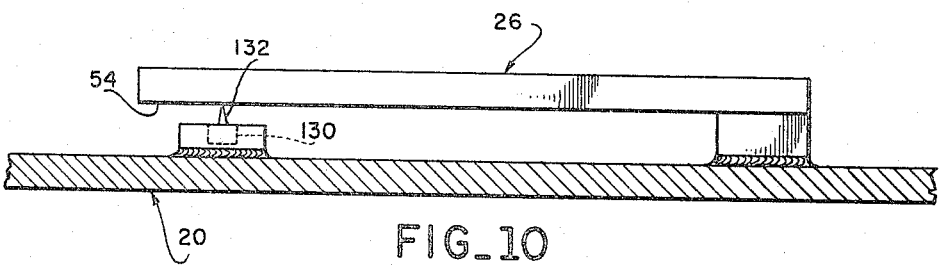
FIG_10
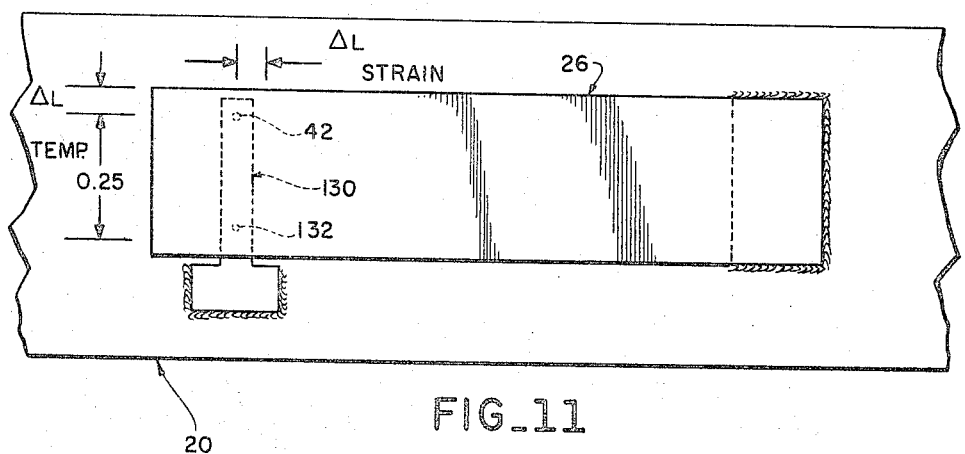
FIG_11

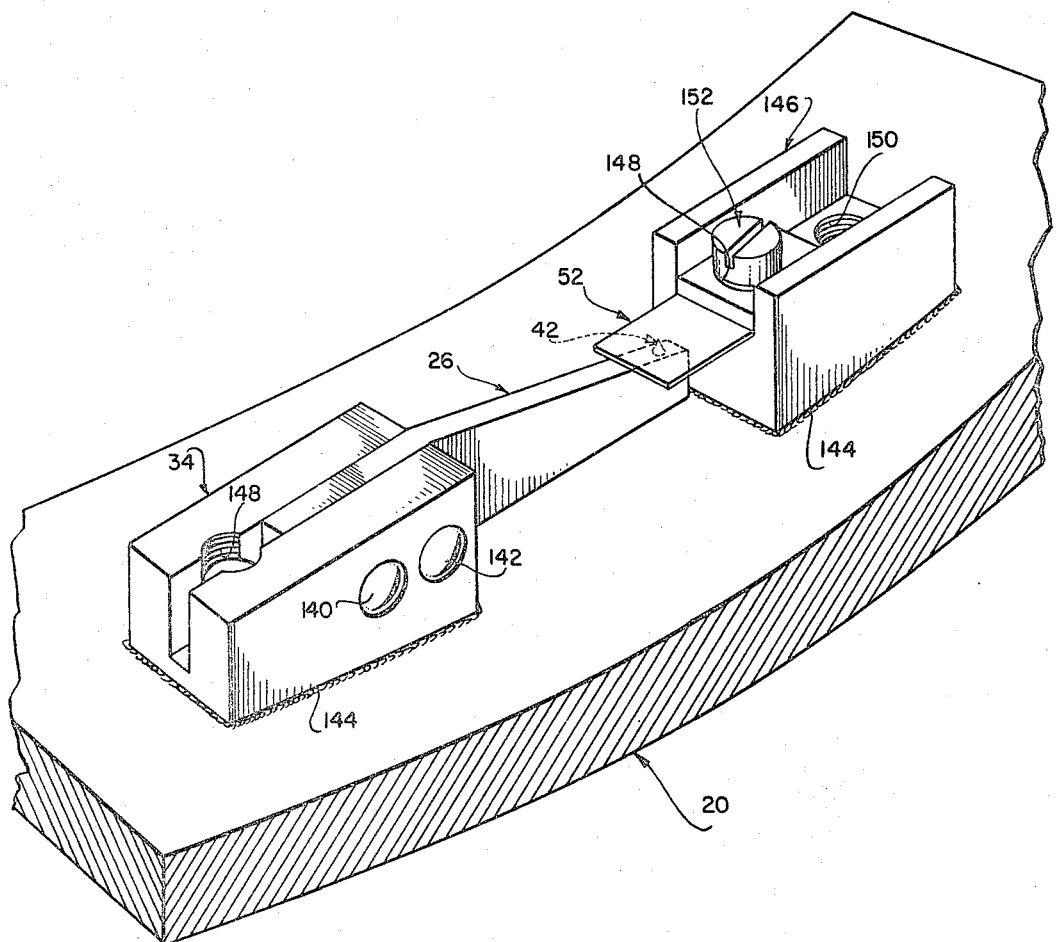
FIG_12

3,331,078
Patented July 11, 1967

3,331,078
AUTOMATICALLY RECORDING SENSORS
Walter L. Howland, Burbank, Calif., assignor to Lockheed Aircraft Corporation, Burbank, Calif.
Filed Sept. 24, 1964, Ser. No. 398,896
13 Claims. (Cl. 346—7)

The present invention relates to sensors and, more particularly, to simple sensors capable of operating continuously over a wide range of severe environmental and structural parameters, including radiation (e.g., gamma and neutron radiation), vibration, shock, and temperatures extending into the extremely high temperatures such as, for example, those encountered by space vehicle structures. Even more particularly, the present invention relates to sensors for automatically recording temperature, strain, pressure and acceleration, singly or in combination, wherein the driving force is supplied by the function being measured itself and data reduction is accomplished from a permanent record developed by the sensor itself.

At the present time, the major emphasis in the obtaining of measurment data and the reduction or retrieval of such data, particularly in experimental work related to space vehicles, has been related to those large numbers of measurements wherein the data is needed in "real" time, that is, the quantity or datum is indicated at a remote location at the actual time of occurrence. When needed for monitoring purposes, such type of data acquisition and reduction is vital. However, there are many data quantities that are so measured which can be analyzed more conveniently and with equal or greater efficacy at a later time, thus freeing telemetering channels and data recorders for "real" time requirements. In fact, with the space and weight limitations presently extant in many applications, much of the data which is needed and/or helpful for design and redesign considerations are being sacrificed or compromised in favor of acquisition of the data needed in real time. In general, the structural designer need not know the time of occurrence of specific loads and temperatures, but must know the maximum magnitudes of such loads and temperatures during any portion of performance. The present invention is directed toward the continuous acquisition of those data related to structural effects, the full benefit of which data can be achieved by later reduction and analysis.

Therefore, the general objects of the present invention include the provision of sensors which can continuously and permanently record variations in temperature, strain, pressure and acceleration, singly and in various combinations, for later reduction and analysis.

Further objects of the present invention include the provision of sensors which can be secured to a structure such as, for example, the inside of the skin or other portions of a space vehicle, and can withstand and/or measure elevated temperatures that the structure can withstand.

Additional objects of the present invention include the provision of sensors which are small, compact, lightweight, and, in particular, obtain their driving forces from the functions being measured, thus eliminating the need for external power sources.

According to the present invention, there is provided a sensor for automatically recording variations in at least one condition occurring in or relative to a structure and obtaining its recording driving force solely from such variations comprising data record means and data transmission means mounted on such structure in relatively movable relationship with respect to each other with the data transmission means in data imposition relationship with respect to the data record means, at least one of such means being responsive to variations in at least one of such conditions for causing such relative movement whereby the data transmission means records such relative movement on the data record means.

More specifically, a target member and at least one data-responsive member are secured to a structure in relatively movable relationship to each other, the target comprising a data recording medium, and the data-responsive member comprising means for imposing a continuous and permanent record in the form of a trace upon such medium. In a preferred embodiment of the present invention, the medium constitutes a flat plate having a susceptible surface, and the data-responsive member carries a stylus pressed against the susceptible surface for imposing a record by scratching a continuous trace therein representative of the relative movement between the data-responsive member and the target. It should be understood that the term "data-responsive" is applied to the member or members other than the target member for convenience only and is not meant to exclude the application of such appelation to the target itself, since, in some of the applications described hereinafter, the target is mounted in a manner to be effectively "data-responsive" itself because of independent movement thereof relative to the stylus-bearing member in response to condition variations. In another embodiment of the present invention, the target comprises a radiation sensitive material and the data-responsive member carries a radioactive source for producing a narrow beam of radiation upon the target, thus eliminating mechanical contact between the recording "head" and recording medium.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a side elevational view of a sensor in accordance with the present invention for measuring temperature versus strain;

FIGURE 2 is a bottom plan view, partly in section, of the sensor shown in FIGURE 1 as seen along line 2—2;

FIGURE 3 is a side elevational view of another embodiment of a sensor for recording temperature versus pressure;

FIGURE 4 is an elevational view of the target as seen from the left in FIGURE 3;

FIGURE 5 is a top plan view of another embodiment of a sensor for recording temperature versus acceleration;

FIGURE 6 is a side elevational view of another embodiment of a sensor for recording acceleration versus strain;

FIGURE 7 is a top plan view of the sensor shown in FIGURE 6;

FIGURE 8 is a side elevational view of another embodiment of a sensor for recording pressure versus acceleration;

FIGURE 9 is a side elevational view of another embodiment of a sensor for recording strain versus temperature or any other variable desired, employing radiographic recordings;

FIGURE 10 is a side elevational view of another embodiment of a sensor for recording strain versus temperature and providing a reference trace;

FIGURE 11 is a top plan view of the sensor shown in FIGURE 10; and

FIGURE 12 is a perspective view of one embodiment of the present invention.

It should be noted that the drawings are greatly enlarged, the actual devices having dimensions of approximately 1″ x ¼″–½″, and the recorded traces being normally subjected to magnification or the equivalent thereof in the order of 1000 times for optical and/or visual data reduction for extreme accuracy.

Referring to FIGURES 1 and 2, there is seen a portion of the structural member 20, which may be the skin of a recoverable space vehicle, upon the inside surface 22 of which is mounted a temperature versus strain recording sensor, indicated generally at 24. A data-responsive arm member 26 is mounted at one end 28 thereof to the structural member 20 as by a weld 30 and comprises a bi-metal strip 32 secured between a mounting portion 34 and an extension arm 36. The bi-metal strip 32 consists of two metallic elements 38 and 40 having differing thermal coefficients of expansion whereby variations in environmental temperature cause arcuate pivoting of the arm member 26 about the mounting portion 34, the extension arm 36 being provided primarily for amplification of the temperature-responsive deflection of the bi-metal strip 32. The data-responsive arm member 26 further comprises a stylus 42 secured to, and projecting vertically upwardly from, a stylus arm 44 constituting a further amplification extension of the extension arm 36.

A target member 46 is mounted to the structural member 20 as by a weld 48 and comprises a vertical standoff portion 50 integrally provided with a horizontal target plate portion 52 having a downwardly directed surface 54, the latter constituting a data recording surface and being in forced contact with the stylus 42. The recording medium or surface 54 is composed of a susceptible material, i.e., in the case of a mechanical stylus 42, capable of being impressed and/or scratched to form a continuous trace record of the relative movement between the stylus 42 and the target surface 54, such as is exemplified by the scratch trace 56 seen in FIGURE 2.

The operation of the sensor illustrated in FIGURES 1 and 2 may be described in the following manner. The data-responsive members 26 and 46 are mounted in a line along an axis of potential strain of interest, the effective mean distance between the mounting portions 34 and 50 being initially known. As the structural member 20 is subjected to operational stresses, the resulting strain in the structural member 20 will cause corresponding relative movement between the data-responsive member 26 and 46, resulting in scratching movement of the stylus 42 upon the susceptible surface 54 in the direction of strain indicated. Simultaneously, variations in the environmental temperature cause corresponding deflection of the stylus 42 at the end of the data-responsive arm member 36 because of the differing thermal coefficients of expansion of the bi-metallic strip portions 38 and 40, thus causing relative scratching movement of the stylus 42 upon the recording surface 54 in the temperature record direction indicated, being at a right angle to the direction of strain deflection. Of course, the device illustrated does not provide a time base and, regarding the strain and temperature deflection directions only and individually, only the maximum would be of any particular engineering value or importance. However, as an important feature of the present invention, the recorded trace 56 constitutes a data envelope of strain versus temperature such that the relative effects of stress and temperature upon the structural member 20 can be correlated, albeit not in real time. The importance of the capability of being able to correlate the occurrence of strain versus temperature in relative time is well-known and can be appreciated more fully when compared to existing methods involving the separate sensing and recording of strain and temperature data and providing a real time base for such data so that their relative time occurrence can be correlated.

Referring to FIGURES 3 and 4, there is seen a temperature versus pressure recorder and sensor, indicated generally at 58, comprising a hollow rectangular chamber having mounting portions 62 and 64 at opposite ends thereof, the latter being secured to the inner surface 22 of the structural member 20 as by respective rivets 66 and 68. The structural member 20 is provided with an aperture 70 within which the chamber 60 fits in a manner such that the outer skin surface 72 of the chamber 60 is flush with the outer skin surface 74 of the structural member 20 for surface continuity therewith. A target member 76 is secured along one edge 78 thereof to the inner surface of the chamber 60 at the symmetrical center thereof between the ends 80 and 82 of the chamber 60 so that, when the wall 84 of the chamber 60 is exposed to external pressure variations, the beam-type deflections of the chamber wall 84 will cause vertical (as seen in FIGURE 3) movement of the target member 76 without tilting thereof since the center of the chamber wall 84 will constitute effectively the apex of a catenary curve. Thus, the target member 76 constitutes a pressure data-responsive member and obtains its recording force directly from and in response to pressure changes. Another data-responsive member 86 is secured at its butt end 88 to the end 80 of the chamber 60, resides and moves in a plane at right angles to the plane of the target member 76, and comprises a bi-metallic strip portion 22 constrained to deflect in a plane at right angles to the direction of pressure-responsive deflection of the target member 76, an extension arm portion 26, a stylus arm 44, and a stylus 42 bearing against the recording surface 54 of the target member 76.

The operation of the sensor illustrated in FIGURES 3 and 4 may be described in the following manner. With the point of the stylus 42 bearing against the surface 54 of the target member 76 at point A as the initial or starting point, the occurrence of an increase of pressure external of the structure relative to the pressure inside of the chamber 60 causes the chamber wall 84 to flex inwardly of the chamber whereby the target member 76 moves vertically past the stylus 42 so that the stylus 42 marks or scribes a permanent record line, indicated by the dash line B. However, simultaneously, any changes in temperature sensed by the bi-metallic strip portion 22 causes the stylus 42 to move laterally in a plane at right angles to the direction of movement of the target member 76. Thus, in the absence of any temperature variations, a maximum pressure differential variation corresponding to the point C will cause a permanent record scribe line B between the points A and C, whereas the occurrence of both pressure and temperature variations will cause the permanent record line to assume a curved or otherwise non-linear disposition or path exemplified by the line D. Naturally, if the environmental conditions of pressure and temperature return to the same values prevailing at the time of the start of the test or measurements, the scribed line will appear as a closed loop because of return of the relative positions of the stylus 42 and the target plate 76 represented by the starting point A.

Referring to FIGURE 5, there is seen an acceleration versus temperature sensor and recorder. The target member 90 is mounted to the end of the bi-metallic temperature-responsive member 92 so that the planar recording surface 94 of the target member 90 resides in the plane of movement of the temperature-responsive member 92. An acceleration-responsive member 96 includes a seismic mass 98 mounted on the end of a rod 100, the other end of which is secured to the structure at 102. A stylus 42 is secured to the seismic mass 98 and bears against the target surface 94 so that relative movement of the target 90 with respect to the stylus 42 causes a permanent record scribe line, such as exemplified by the line 104, to be imposed upon the target surface 94. Thus, in operation, ambient temperature variations cause scribe deflections in one coordinate direction whereas acceleration in the plane of the target surface 94 and at right angles to the direction of temperature-responsive deflection causes scribed deflection in the other coordinate direction.

Referring to FIGURES 6 and 7, there are seen simplified schematic diagrams of a vibration or acceleration sensor and recorder in which the target member 106 is secured to the structure and the G-force mass 108 is provided with the stylus 42 bearing against the target surface 54 and is located at the end of an arm 110 secured to the structure 20. By virtue of separation of the points at which the target member 106 and the acceleration member arm 110 are secured to the structure 20, vibratory motion in the same plane but at right angles to the direction of sensitivity of the acceleration-responsive mass 108 is recorded in the X direction (as seen in FIGURE 7) whereas the deflection due to acceleration is recorded in the Y direction.

Referring to FIGURE 8, there is seen a simplified schematic diagram of a pressure versus vibration or acceleration sensor and recorder in which a chamber 60 is provided with a target member 76 for operation as heretofore described in connection with FIGURES 3 and 4, and a mass 108 is provided with a stylus 42 and is located at one end of the arm 110, the other end of which is effectively secured to the structure 20 by means of the chamber wall 80 so that the mass 108 responds in deflection movement in a plane at right angles to the direction of deflection movement of the target member 76 for scribing the target surface 54 in a manner similar to that described in connection with FIGURES 3 and 4.

Referring to FIGURE 9, there is seen a simplified schematic diagram of a sensor employing radiographic means for recording, for example, strain versus temperature. A bimetallic temperature-responsive member 26 is secured at one end thereof to the structure 20 and is provided at the other end thereof with a radioactive source material 120 having a radioactive shield member 122 for shielding in at least one direction therefrom, the shield 122 having a small aperture or radioactive window 124 therethrough as a directed passage for the transmission of radiation to a radiation-sensitive target member 126 which is secured to another portion of the structure 20. The target member 126 may be provided with a radiation-sensitive surface 128, or may be composed of a material the crystal structure of which is affected by radiation. Any convenient radioactive source material 120 may be employed, such as, for example, polonium-210 (having a half-life of approximately 138 days) or strontium-90 (having a half-life of approximately 30 years). The strain versus temperature functional operation of the device is the same as previously described in connection with FIGURES 1 and 2, with the recording function being performed by the imposition of a radioactive trace upon the target member 126 for causing radiation-sensitive changes therein or thereon.

Referring to FIGURES 10 and 11, there is seen a strain versus temperature sensor and recorder wherein the target member 26 is secured at one end thereof to the structural member 20 and has its target surface 54 at the other end thereof disposed over a temperature-responsive member 130, the latter being secured to the structural member 20 at a gauge distance spaced from the point of attachment of the target member 26 to the structural member 20 such that the strain in the structural member 20 occurring therebetween causes corresponding relative movement of the target member 26 with respect to the temperature-responsive member 130. The member 130 comprises a bar of material having a sufficiently high thermal coefficient of expansion to cause relative movement between a reference stylus 132 and a recording stylus 42 so that the dual traces scribed upon the target surface 54 constitute a displacement temperature versus strain and a reference temperature versus strain record, respectively, whereby the difference between such traces in the temperature-deflection direction equals the gauge deflection difference between the reference and recording styli locations on the member 130.

Referring to FIGURE 12, there is seen an actual embodiment of a strain versus temperature sensor in accordance with the present invention. The bi-metallic temperature-responsive member 26 is secured to a mounting block 34 by a pair of rivets 140 and 142, and the mounting block 34 is secured to the structural member 20 by an adhesive cement 144. The target plate 52 is secured at one end thereof to a target mounting block 146 by a bolt 148, the mounting block 146 being attached to the structural member 20 by the adhesive cement 144. The stylus 42 is mounted to the movable end of the temperature-responsive member 26 and bears against the target surface on the underside of the target plate 52. The target plate 52 is composed of a resilient material so as to act as a leaf spring which is forcibly flexed by the pressure of the stylus 42 thereagainst during the mounting operation whereby the stylus-to-target contact is pre-loaded to prevent contact chatter during environmental vibration. The mounting blocks 34 and 146 are provided with vertical parallel holes 148 and 150, respectively, which are internally threaded for receiving bolts (not shown) projecting from a gauge block (not shown) during the operation of mounting the blocks 34 and 146 to the structural member 20 therebetween.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A sensor for automatically recording variations in acceleration versus strain simultaneously and/or separately occurring in or relative to a structure and obtaining its driving force solely from such variations, comprising:

data record means and data transmission means effectively mounted on such structure at predetermined spaced locations, said data transmission means being in data imposition relationship to said data record means, and said data record means being adapted to relatively permanently retain such imposed data;

said data transmission means comprising an acceleration-responsive member adapted to deflect in a planar mode relative to said data record means in direct response to variations in acceleration applied to said sensor along a first axis; and said data record means being deflectible in a planar mode relative to said data transmission means in direct response to variations in the strain condition of said structure for causing imposition of strain data along a second axis transverse to said first axis whereby the imposed data constitutes a data envelope for correlation of acceleration relative to strain.

2. A sensor in accordance with claim 1, wherein:

said data record means comprises a target member having a planar susceptible surface; and said data transmission means includes a stylus pressed against said susceptible surface, whereby such data envelope consists of a continuous trace scratched in said surface by said stylus.

3. A sensor in accordance with claim 1, wherein:

said data record means comprises a planar target of radiation-sensitive material; and said data transmission means includes a radioactive source adapted to produce and direct a narrow beam of radiation against said target, whereby such data envelope consists of a continuous radiated trace in said target.

4. A sensor for automatically recording variations in pressure versus acceleration simultaneously and/or separately occurring in or relative to a structure and obtaining its driving force solely from such variations, comprising:

first data-responsive means comprising an acceleration-responsive member having a first support portion and a first end portion, said first support portion being secured to such structure at a first location, said first data-responsive means being responsive to a variation in acceleration applied to said sensor for causing deflection of said acceleration-responsive member in a first substantially planar mode whereby said first end portion deflects proportionally along an effectively rectilinear first axis;

second data-responsive means having a wall portion susceptible to beam-type deflection and a second end portion extending from said wall portion, said wall portion being secured to such structure, said second data-responsive means being responsive to a variation in pressure applied to said sensor for causing deflection of said wall portion in a second substantially planar mode parallel to said first planar mode and effectively transverse to said first axis whereby said second end portion deflects proportionally along an effectively rectilinear second axis transverse to said first axis;

one of said end portions comprising data record means; and the other of said end portions comprising data transmission means in data imposition relationship to said data record means.

5. A sensor in accordance with claim 4, wherein:
said data record means comprises a target member having a planar susceptible surface; and
said data transmission means includes a stylus pressed against said susceptible surface whereby said stylus scratches a continuous trace in said susceptible surface for recording the magnitude of both of such proportional deflections simultaneously.

6. A sensor in accordance with claim 4, wherein:
said data record means comprises a planar target of radiation-sensitive material; and
said data transmission means includes a radioactive source adapted to produce and direct a narrow beam of radiation against said target, whereby a continuous radiated trace is imposed in said target for recording the magnitude of both of such proportional deflections simultaneously.

7. A sensor for automatically recording variations in temperature versus strain simultaneously and/or separately occurring in or relative to a structure and obtaining its driving force solely from such variations, comprising:

first data-responsive means comprising an arm member having a first support portion and a first end portion, said first support portion being secured to such structure at a first location, said arm member comprising a bi-metal strip responsive to variations in temperature conditions for causing deflection of said arm member in a first planar mode whereby said first end portion deflects proportionally along an effectively rectilinear first axis;

second data-responsive means having a second support portion and a second end portion, said second support portion being secured to such structure at a second location a predetermined spaced distance from said first location along a second axis transverse to said first axis, said second data-responsive means being responsive to variations in the strain condition in such structure between said first and second locations for causing relative deflection of at least said second end portion in a second planar mode parallel to said first planar mode and effectively transverse to said first axis whereby said second end portion deflects relative to said first end portion proportional to said strain variations along said second axis;

one of said end portions comprising data record means; and the other of said end portions comprising data transmission means in data imposition relationship to said data record means.

8. A sensor in accordance with claim 7, wherein:
said data record means comprises a target member having a planar susceptible surface; and
said data transmission means comprises a stylus pressed against said susceptible surface whereby said stylus scratches a continuous trace in said susceptible surface for recording the magnitude of both of such proportional deflections simultaneously.

9. A sensor in accordance with claim 7, wherein:
said data record means comprises a planar target of radiation-sensitive material; and
said data transmission means comprises a radioactive source adapted to produce and direct a narrow beam of radiation against said target, whereby a continuous radiated trace is imposed in said target for recording the magnitude of both of such proportional deflections simultaneously.

10. A sensor for automatically recording variations in temperature versus strain simultaneously and/or separately occurring in or relative to a structure and obtaining its driving force solely from such variations, comprising:

first data-responsive means comprising an arm member having a first support portion and a first end portion, said first support portion being secured to such structure at a first location, said arm member having a predetermined temperature coefficient of expansion for causing elongation deflection of said arm member in a first planar mode in response to temperature variations whereby said arm member and said first end portion deflect proportionally along a rectilinear first axis;

second data-responsive means having a second support portion and a second end portion, said second support portion being secured to such structure at a second location a predetermined spaced distance from said first location along a second axis transverse to said first axis, said second data-responsive means being responsive to variations in the strain condition in such structure between said first and second locations for causing relative deflection of at least said second end portion in a second planar mode parallel to said first planar mode and transverse to said first axis whereby said second end portion deflects relative to said end portion proportional to said strain variations along said second axis;

one of said end portions comprising data record means; and the other of said end portions comprising data transmission means in data imposition relationship to said data record means.

11. A sensor in accordance with claim 10, wherein:
said data record means comprises a target member having a planar susceptible surface; and
said data transmission means comprises a stylus pressed against said susceptible surface whereby said stylus scratches a continuous trace in said susceptible surface for recording the magnitude of both of such proportional deflections simultaneously.

12. A sensor in accordance with claim 10, wherein:
said data record means comprises a planar target of radiation-sensitive material; and
said data transmission means comprises a radioactive source adapted to produce and direct a narrow beam of radiation against said target, whereby a continuous radiated trace is imposed in said target for recording the magnitude of both of such proportional deflections simultaneously.

13. A sensor for automatically recording variations in temperature versus strain simultaneously and/or separately occurring in or relative to a structure and obtaining its driving force solely from such variations, comprising:

first data-responsive means comprising an arm member having a first support portion and a first end portion, said first support portion being secured to such structure at a first location, said arm member having a predetermined temperature coefficient of expansion for causing elongation deflection of said arm member in a first planar mode in response to temperature variations whereby said arm member and said first end portion deflect proportionally along a rectilinear first axis;

second data-responsive means having a second support portion and a second end portion, said second support portion being secured to such structure at a second location a predetermined spaced distance from said first location along a second axis transverse to said first axis, said second end portion being disposed adjacent said arm member, said second data-responsive means being responsive to variations in the strain condition in such structure between said first and second locations for causing relative deflection of at least said second end portion in a second planar mode parallel to said first planar mode and transverse to said first axis whereby said second end portion deflects relative to said first end portion proportional to said strain variations along said second axis;

said second end portion comprising a target member having a planar susceptible surface; and said arm member being provided with a recording stylus located on said first end portion and a reference stylus located adjacent said first support portion, both of said styli being pressed against said susceptible surface whereby each of said styli scratches a continuous trace in said susceptible surface for recording the magnitude of both of such proportional deflections simultaneously for presenting records of both displacement temperature versus strain and reference temperature versus strain.

References Cited
UNITED STATES PATENTS

| | | | |
|---|---|---|---|
| 1,216,272 | 2/1917 | Berry | 346—3 |
| 1,590,452 | 6/1929 | Sparkes | 346—74 |
| 2,099,725 | 11/1937 | De Forest | 346—77 X |
| 2,330,959 | 10/1943 | De Forest | 346—129 X |
| 2,358,102 | 9/1944 | Robertson | 346—77 |
| 2,365,227 | 12/1944 | Unterberg | 346—4 |
| 2,441,162 | 5/1948 | McPherson. | |
| 2,932,967 | 4/1960 | Prewitt et al. | 73—88 |
| 3,147,431 | 9/1964 | Bennett et al. | |

RICHARD B. WILKINSON, *Primary Examiner.*

J. W. HARTARY, *Assistant Examiner.*